(No Model.) 2 Sheets—Sheet 2.

J. R. GOODMAN.
DRAG AND HARROW.

No. 398,960. Patented Mar. 5, 1889.

WITNESSES:

INVENTOR:
J. R. Goodman
BY Munn & Co.
ATTORNEYS.

UNITED STATES PATENT OFFICE.

JOHN R. GOODMAN, OF CALUMET, MISSOURI.

DRAG AND HARROW.

SPECIFICATION forming part of Letters Patent No. 398,960, dated March 5, 1889.

Application filed July 13, 1888. Serial No. 279,834. (No model.)

*To all whom it may concern:*

Be it known that I, JOHN R. GOODMAN, of Calumet, in the county of Pike and State of Missouri, have invented a new and useful Improvement in Drags and Harrows, of which the following is a full, clear, and exact description.

The invention consists in the peculiar construction and combinations of parts, a prominent feature being in constructing drags or harrows or combined drags and harrows, of two or more sections hinged together in the simple and durable manner hereinafter particularly described, and pointed out in the claims.

Reference is to be had to the accompanying drawings, forming a part of this specification, in which similar letters of reference indicate corresponding parts in all the figures.

Figure 1:
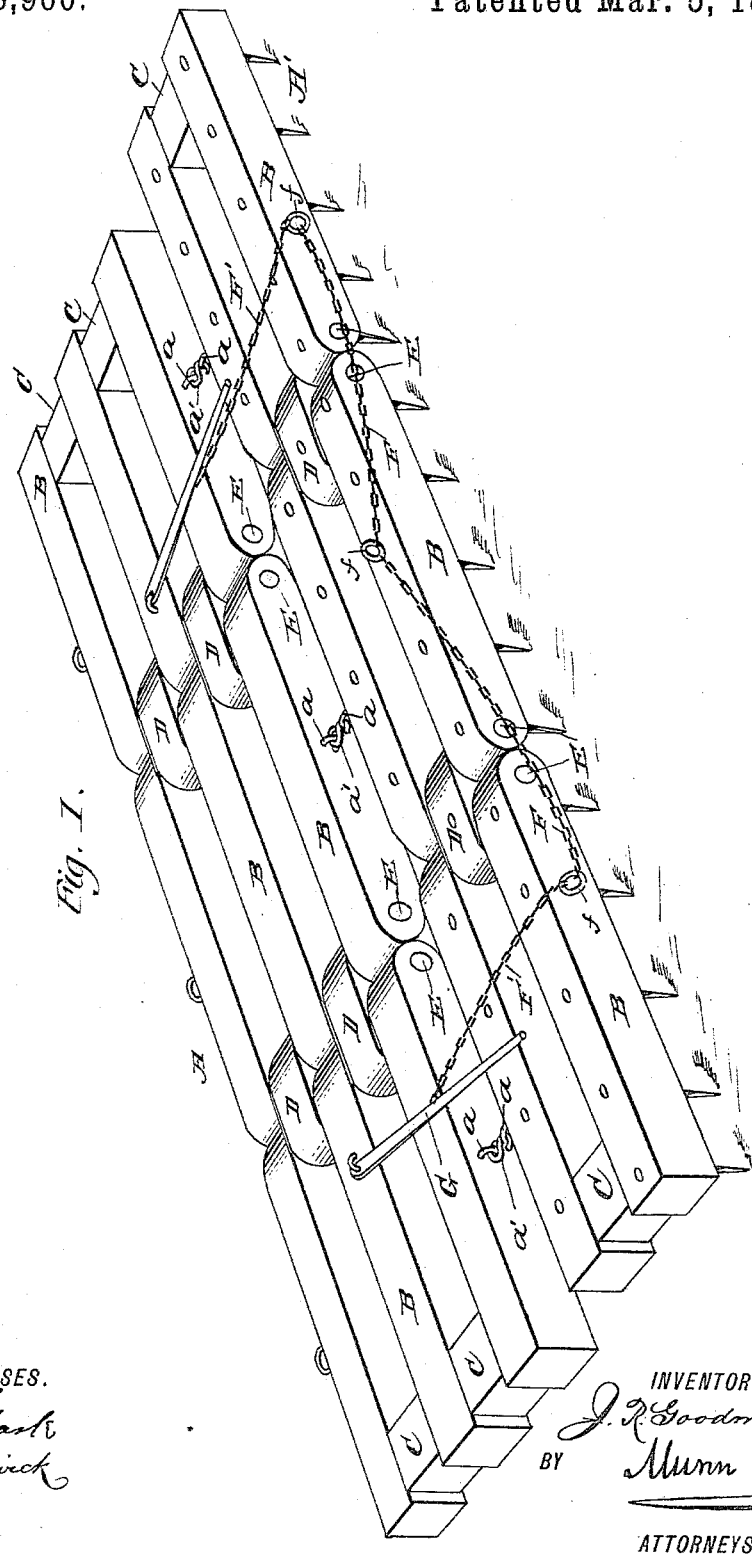
Figure 2:
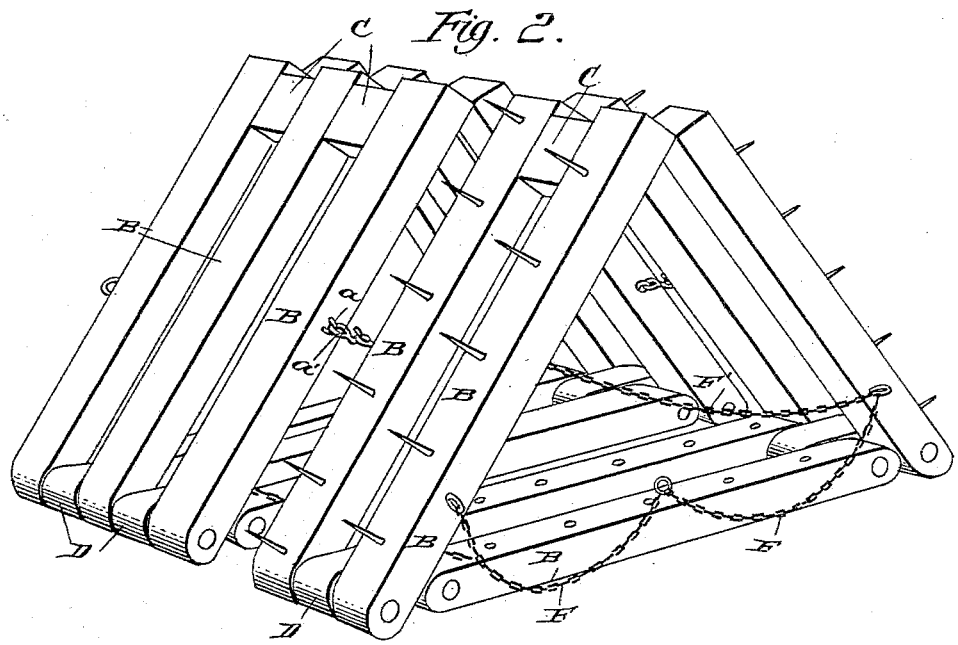
Figure 3:
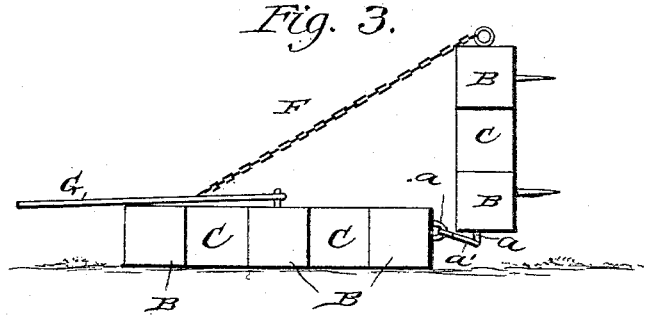

Figure 1 is a perspective view of a combined drag and harrow embodying my invention, showing them in the open working position. Fig. 2 is a like view of the same, showing the side sections folded or raised to allow of its being drawn through a narrow passage, as a gate; and Fig. 3 is an end view showing the harrow raised.

In the drawings I have illustrated the invention as embodied in a combined drag and harrow, each of which consists of three sections, and the invention will be described in connection therewith; but it will be understood that the invention is applicable to drags or harrows alone, and that there may be any desired number of hinged sections of any desired size.

In the construction shown, A indicates the drag and A' the harrow, the two being united by staples $a$ and S-hooks $a'$, or by other suitable connections that will allow of their being thrown over one on the other, to be used interchangeably, and that will allow of their being readily detached.

The sections of the drag and harrow are formed of a series of beams, B, of any preferred length, the drag-sections having, preferably, three such beams and the harrow-sections two. Between the beams of the end sections at the outer ends thereof are secured fixed spacing-blocks C, and between the inner ends of the beams of the end sections at their junction with the beams of the middle section are loosely-fitted spacing-blocks D, projecting between the beams of both sections.

The loosely-fitted spacing-blocks D, in connection with long hinge-bolts E, form a hinge or swing connection for the adjoining ends of the sections, the said hinge-bolts E passing, respectively, through the beam ends of the sections and through the ends of the loose spacing-blocks D. Thus it will be seen that the outer or end sections may be readily swung upward and inward toward each other, meeting above the middle sections, whereby the whole may be drawn through a gate or other narrow passage, occupying only a space slightly in excess of the width of one section.

When the drag or harrow is formed of only two sections, the one may be readily swung over onto the other, and will lie flat thereon.

In order that the harrow-sections may be simultaneously raised by the plowman to clear them of weeds and rubbish, I provide the harrow with chains F F F' F', or their equivalents. The chains F are connected by screw-eyes $f$, or otherwise, to the several sections of the harrow at the back thereof, and the chains F' are connected to the outer sections of the harrow and to operating-levers G, which are fulcrumed at one end to the drag-sections, the connection of the chains to the levers G being at a point on the latter intermediate the ends thereof, the arrangement being such that as the free ends of the levers are thrown upward the chains simultaneously lift the harrow-sections, as shown in Fig. 3, and thus clear them of weeds and rubbish.

With the construction shown, the levers will be within reach of the driver.

With the construction of combined drag and harrow above described, the former breaks the clods and levels the ground, and the harrow, following in its wake, will loosen up the soil, preparing it for seeding.

The drag and harrow may be used interchangeably, if desired, by folding the one over onto the other, or they may be detached and either used.

It will be seen that a drag or harrow constructed with sections hinged as described will be very durable and cheap, and may be repaired when necessary by the tools usually available on the farm or plantation.

Having thus described my invention, what I claim as new, and desire to secure by Letters Patent, is—

1. A drag or harrow consisting of two or more sections hinged together by loose spacing-blocks between the respective beams of the sections at the adjoining ends thereof, and bolts passing through the ends of the beams of the respective sections and through opposite ends of the said spacing-blocks, substantially as described.

2. A drag or harrow consisting of two or more sections hinged together by means of loose spacing-blocks between the respective beams of the sections at the adjoining ends thereof, and bolts passing through the ends of the respective sections and through the opposite ends of the said spacing-blocks, as set forth, the outer ends of the outer sections being spaced by fixed spacing-blocks, substantially as described.

3. A combined drag and harrow consisting of a drag composed of jointed sections and a harrow composed of jointed sections, the two being hinged together, substantially as described.

4. The combination, with a drag and harrow hinged together and each composed of jointed sections, of chains F, connecting the several sections of the harrow, the levers G, pivoted to the end sections of the drag, and the chains F', secured to the end sections of the harrow and to the said levers, substantially as described.

JOHN R. GOODMAN.

Witnesses:
WILLIAM J. MACKEY,
ALEX W. LUKE.